United States Patent [19]

Langbo et al.

[11] Patent Number: 5,099,711
[45] Date of Patent: Mar. 31, 1992

[54] TOOTH BUTT/BUZZ CONTROL METHOD/SYSTEM

[75] Inventors: Robert W. Langbo, Three Rivers; Mark D. Boardman, Portage, both of Mich.

[73] Assignee: Eaton Corporation, Cleveland, Ohio

[21] Appl. No.: 697,384

[22] Filed: May 9, 1991

[51] Int. Cl.$^5$ .................. F16H 5/42; B60K 20/10
[52] U.S. Cl. ..................... 74/336 R; 74/335
[58] Field of Search ............... 74/336 R, 335

[56] References Cited

U.S. PATENT DOCUMENTS

| | | | |
|---|---|---|---|
| 4,361,060 | 11/1982 | Smyth | 74/866 |
| 4,527,447 | 7/1985 | Richards | 74/866 |
| 4,595,986 | 6/1986 | Daubenspeck et al. | 364/424.1 |
| 4,614,126 | 9/1986 | Edelen et al. | 74/333 |
| 4,727,764 | 3/1988 | Klane | 74/336 R |
| 4,784,019 | 11/1988 | Morscheck | 74/720 |
| 4,860,861 | 8/1989 | Gooch et al. | 192/3.26 |
| 4,899,607 | 2/1990 | Stainton | 74/335 |

OTHER PUBLICATIONS

SAE Paper No. 881830 presented 11/88.
SAE Standard J1922.

*Primary Examiner*—Dirk Wright
*Attorney, Agent, or Firm*—H. D. Gordon

[57] ABSTRACT

A control method/system for an automated mechanical transmission system 12) including a nonsynchronized transmission (14) is provided with logic rules for detecting and responding to conditions indicative of jaw clutch tooth (98 a/b, 114 a/b, 118 a/b, 120 a/b, 128 a/b butt. and/or tooth buzz.

39 Claims, 5 Drawing Sheets

TOOTH BUTT/BUZZ CONTROL METHOD/SYSTEM

BACKGROUND OF THE INVENTION

1. Related Applications

This application is related to co-pending U.S. patent applications:

Ser. No. 07/698,751 entitled COMPOUND POWER DOWNSHIFT METHOD/SYSTEM;

Ser. No. 07/698,745 entitled RANGE SHIFTING ONLY FAULT TOLERANCE METHOD/SYSTEM;

Ser. No. 07/697,813 entitled THROTTLE CONTROL FAULT DETECTION AND TOLERANCE METHOD/SYSTEM;

Ser. No. 07/698,752 entitled SMOOTH UPSHIFT CONTROL METHOD/SYSTEM;

Ser. No. 07/698,017 entitled DRIVELINE TORQUE LIMIT CONTROL STRATEGY-USING SAE J1922 TYPE ENGINE CONTROL;

Ser. No. 07/697,814 entitled TORQUE CONVERTER SLIP RATE BASED SKIP POWER DOWNSHIFT CONTROL STRATEGY, all filed the same day, May 9, 1991, and assigned to the same assignee, Eaton Corporation, as this application.

2. Field of the Invention

The present invention relates to a control system and control method for controlling the operation of an automated mechanical transmission system, preferably of the type including an engine, a torque converter, a lock-up/disconnect clutch assembly, a power synchronizer and a mechanical transmission.

In particular, the present invention relates to a control system/method for an automated transmission system as described above wherein logic means are provided for sensing tooth "butt" and/or tooth "buzz" conditions and for taking action to overcome these conditions.

3. Description of the Prior Art

Mechanical transmission systems of the compound range, splitter or combined range and splitter type are well known in the prior art as may be seen by reference to U.S. Pat. Nos. 4,788,889; 4,754,665 and 4,735,109, the disclosures of which are incorporated by reference.

Automatic mechanical transmission systems comprising mechanical transmissions and controls and actuators to automatically shift same, usually electronically controlled in accordance with sensed inputs and predetermined logic rules, are known. Examples of such systems may be seen by reference to U.S. Pat. Nos. 4,648,290; 4,642,771; 4,595,986; 4,527,447; 4,361,060; 4,140,031 and 4,081,065, the disclosures of which hereby incorporated by reference. Such systems may also be seen by reference to SAE Paper No. 831776 titled "AUTOMATED MECHANICAL TRANSMISSION CONTROLS", the disclosure of which is hereby incorporated by reference.

Fault tolerance logic routines for automatic transmissions are known as may be seen by reference to U.S. Pat. Nos. 4,922,425, 4,849,899 and 4,899,279, the disclosures of which are hereby incorporated by reference.

Automatic transmission systems including a torque converter drivingly interposed a drive engine and a mechanical change gear transmission and/or including torque converter bypass or lock-up devices are also known as may be seen by reference to U.S. Pat. Nos. 3,593,596; 4,261,216; 4,271,724; 4,351,205 and 4,375,171, the disclosures of which are hereby incorporated by reference.

Automatic mechanical transmission systems utilizing power synchronizer devices, i.e. devices independent of engine speed to provide input shaft braking and acceleration, and not manipulation of engine speed, to synchronize the transmission jaw clutch members are known in the prior art. Examples of such systems may be seen by reference to U.S. Pat. Nos. 3,478,851, 4,023,443; 4,140,031 and 4,614,126, the disclosures of which are hereby incorporated by reference.

Automatic mechanical transmission systems having a power synchronizer and also having a torque converter drivingly interposed a drive engine and the transmission input shaft, and including a torque converter lock-up/disconnect clutch assembly, are known. Examples of such systems may be seen by reference to U.S. Pat. Nos. 4,784,019 and 4,860,861 and S.A.E. Paper No. 881830 entitled "THE EATON CEEMAT (CONVERTER ENHANCED ELECTRONICALLY MANAGED AUTOMATIC TRANSMISSION)", the disclosures of which are hereby incorporated by reference.

Such transmission systems provide an automatic mechanical transmission system utilizing a mechanical change gear transmission of a structure identical or substantially identical to the structure of transmissions intended for manual usage, providing the advantages of a torque converter for vehicle start-ups and the advantages of nonslipping connection between the engine and transmission at higher vehicle speeds/gear ratios and providing relatively rapid synchronization of the transmission positive jaw clutches. By providing an automatic mechanical transmission system based upon the same, or substantially the same, mechanical change gear transmission utilized for manual transmission systems, manufacturing, inventory and maintenance cost savings are obtained. To the transmission is added, if necessary, shifting mechanisms suitable for automatic control by solenoids or the like. An example of such a shifting mechanism may be seen by reference to above-mentioned U.S. Pat. Nos. 4,361,060 and 4,899,607 and U.S. Pat. Nos. 4,873,881; 4,722,237 and 4,445,393, the disclosures of which are hereby incorporated by reference. A power synchronizer mechanism as disclosed in above-mentioned U.S. Pat. Nos. 4,614,126; 3,478,851 or 4,023,443 is also added for synchronizing the transmission positive jaw clutches.

A torque converter is drivingly interposed the drive engine and transmission. A torque converter lock-up and disconnect clutch structure is provided comprising a first and a second separate, independently operable, clutches, preferably friction clutches, for coupling the torque converter driven member or tribune to the transmission input shaft and for coupling the torque converter input or impeller (i.e. the engine output) to the transmission input shaft, respectively.

The torque converter is drivingly interconnected between the engine and transmission only when the first coupling is engaged and the second disengaged. The torque converter is locked-up, i.e. the turbine driven directly by the engine, when the second clutch is engaged. The transmission is driven directly from the engine, whenever the second clutch is engaged simultaneously with the first clutch.

When the first coupling is disengaged, regardless of the condition of the second coupling, the transmission input shaft is disconnected from the engine torque and also from the inertia of the torque converter and from the inertia of the second coupling allowing the jaw clutches to be easily disengaged, the power synchronizer mechanism to act quickly due to relatively low inertia on the input shaft and also allowing a selected gear to be pre-engaged with the vehicle at rest and in the drive condition.

Electronic and other engine fuel control systems wherein the fuel supplied to the engine may be modulated to provide a desired engine speed, regardless of the operators setting of the throttle pedal, are known in the prior art. Such systems may be seen by reference to above-mentioned U.S. Pat. Nos. 4,081.065; 4,361,060 and 4,792,901 and by reference to the SAE J1922 electronic engine control standards, and related standards SAE J1708, J1587 and J1843, all of which are incorporated by reference.

With automated transmission systems of the type described, i.e. derived from a manual nonsynchronized mechanical transmission, the conditions of tooth butting, i.e. the ends of the teeth of the jaw clutch members coming into abutment rather than axial interengagement and/or tooth buzzing; i.e. the ends of the butted jaw clutch teeth going into a grinding relative rotation rather than into axial interengagement as one of the clutch members is rotated to overcome butting, may occur at vehicle start from stop conditions. In such transmission systems, especially if the master friction clutch or torque disconnect clutch is not closely modulated, it is desirable to provide logic routines for detecting and for overcoming such tooth butt or tooth buzz conditions.

SUMMARY OF THE INVENTION

In accordance with the present invention, the drawbacks of the prior art are overcome or minimized by the provision, in an automated mechanical transmission system of the type described, of sensors and logic rules allowing tooth butt and/or tooth buzz conditions to be detected and the providing system actions to overcome such detected conditions. Preferably, the sensors are sensors such as input and output shaft speed sensors and rail position sensors which are already incorporated into the system for other required control purposes.

The above is accomplished, preferably in an automatic mechanical transmission system based upon a mechanical change gear transmission to which is added shifting mechanisms suitable for automatic control, a power synchronizer mechanism as disclosed in above-mentioned U.S. Pat. Nos. 4,614,126, a torque converter drivingly interposed the drive engine and transmission and a torque converter lock-up and disconnect clutch structure comprising a first and a second separate, independently operable, clutches, preferably friction clutches, for coupling the torque converter driven member or turbine to the transmission input shaft and for coupling the torque converter input or impeller (i.e. the engine output) to the transmission input shaft, respectively, by the provision of means, such as input shaft and output shaft speed sensors, to sense the rotational speed of engaging jaw clutch members, and means, such as rail position sensors, for sensing neutral/not neutral and engaged/not engaged axial movement of jaw clutch members, and logic rules for processing the signals from these sensors to detect and react to tooth butt and/or buzz conditions.

Upon an attempted engagement under start from stop conditions, if the engaging jaw clutch is at a not neutral and not engaged condition, while the jaw clutches are rotating at a synchronous speed, this indicates jaw clutch butting and the system controller will issue commands whereby the master or disconnect clutch is briefly engaged to attempt to rotate or knock the teeth off abutment and allow the teeth to move axially into engagement. If this is not successful, if the rail position sensor continues to indicate a not engaged condition while the speed sensors indicate continued synchronous rotation of the clutch members, the attempt to unbutt is recycled a given number of times, preferably of increasingly long attempts. If this remains unsuccessful, the entire gear engagement process is restarted. During attempts to unbutt the jaw clutches, if the jaw clutch members begin to rotate at significantly nonsynchronous speed, this is indicative of potentially damaging tooth buzz or grinding conditions and the controller will immediately issue commands to disengage the master clutch or disconnect clutch, select neutral, and to restart the entire gear engagement process.

Accordingly, it is an object of the present invention to provide a new and improved automatic mechanical transmission system preferably utilizing a power synchronizer, a torque converter drivingly interposed the engine and mechanical transmission and further utilizing an improved torque converter lock-up and disconnect clutch structure.

Another object of the present invention is to provide an automated mechanical transmission system having control system/method logic for detecting and overcoming tooth butt and/or tooth buzz conditions.

These and other objects and advantages of the present invention will become apparent from a reading of the description of the preferred embodiment taken with the drawings.

DESCRIPTION OF THE PREFERRED EMBODIMENT

Figure 1:
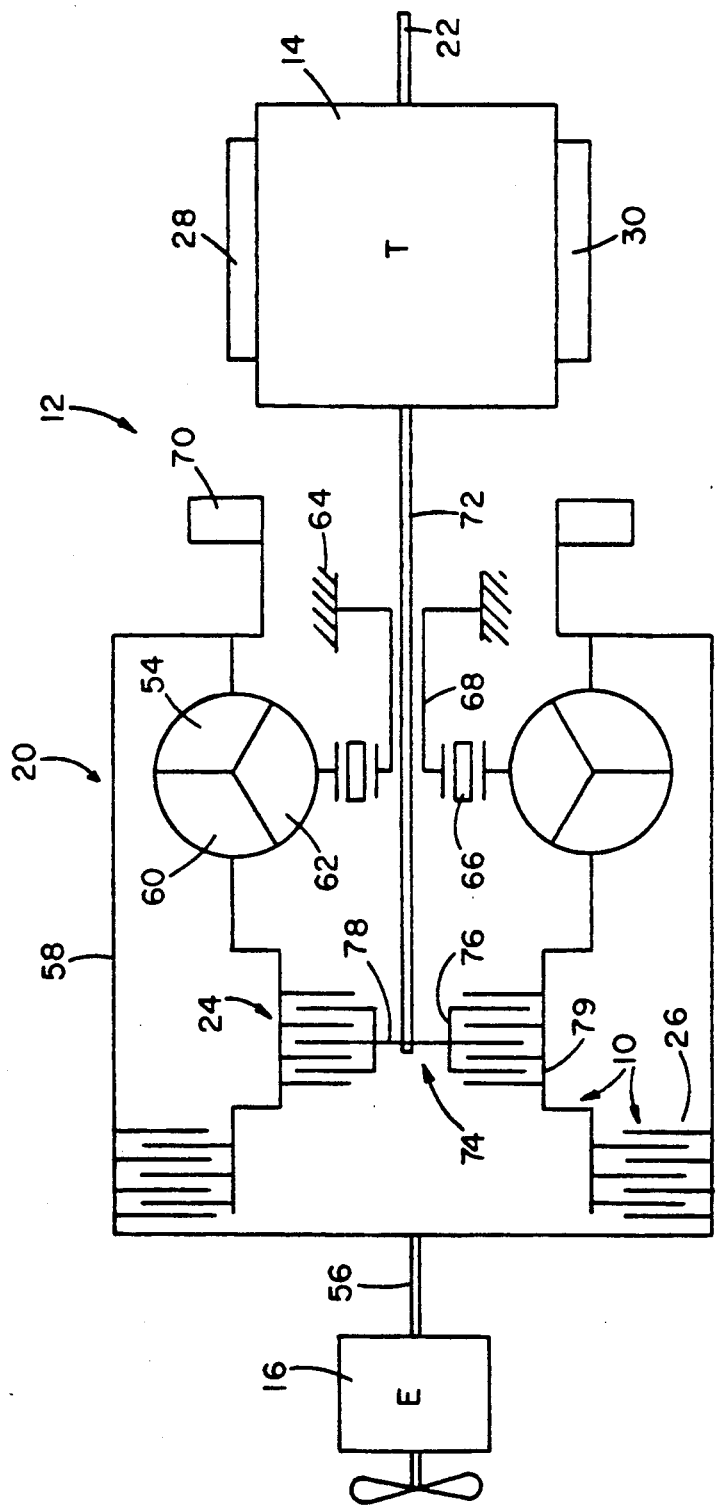
FIG. 1 is a schematic view of the torque converter and torque converter disconnect and bypass clutch structure of the present invention.

Certain terminology will be used in the following description for convenience and reference only and will not be limiting. The words "upwardly", "downwardly", "rightwardly" and "leftwardly" will designate directions in the drawings to which reference is made. The words "inwardly", and "outwardly", refer to directions towards and away from, respectively, the geometric center of the device and designated parts thereof. The above applies to the words above specifically mentioned, derivatives thereof and words of similar import.

Figure 2:
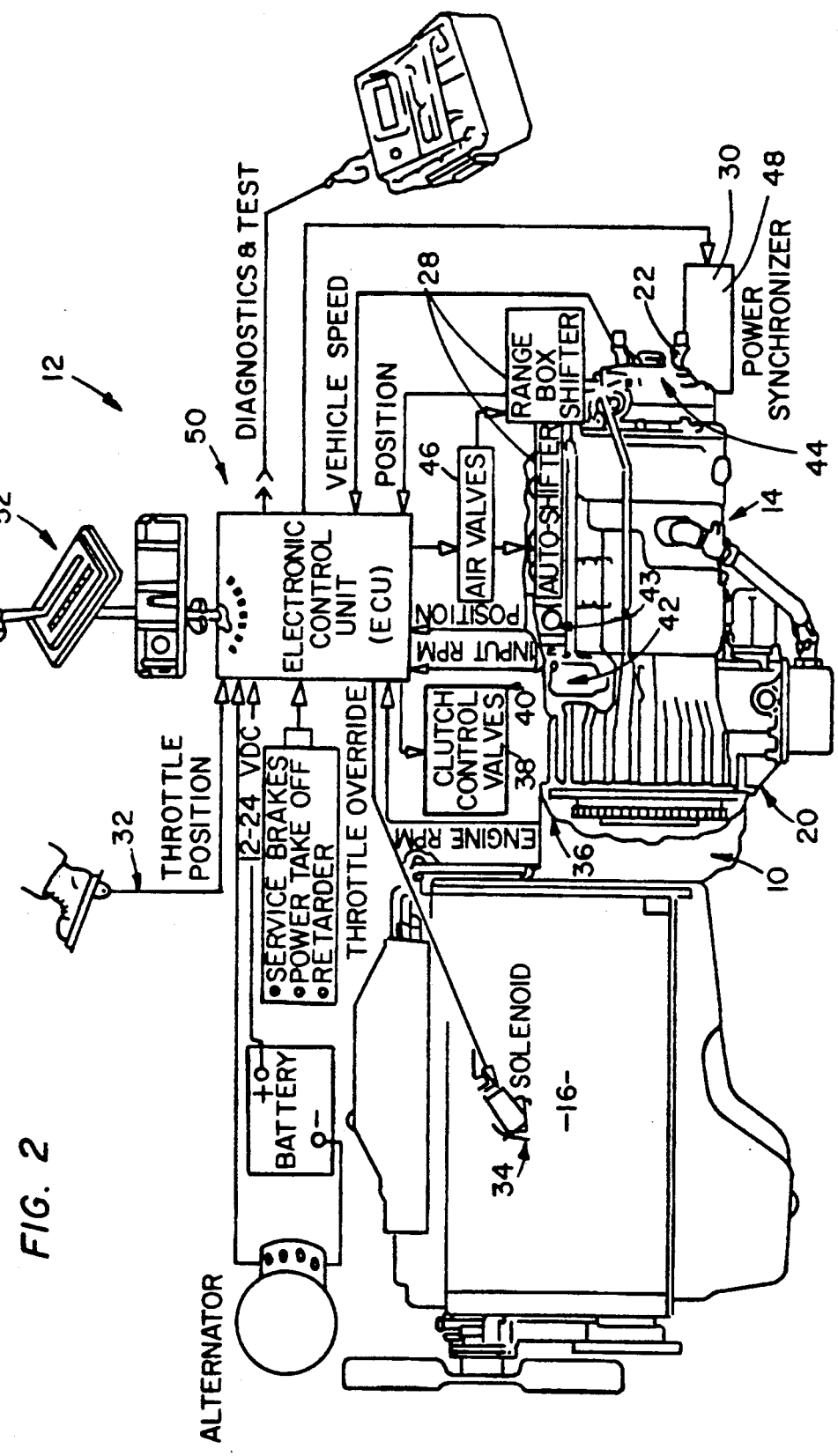
FIG. 2 is a schematic illustration of the automatic mechanical transmission system of the present invention.
Figure 3:
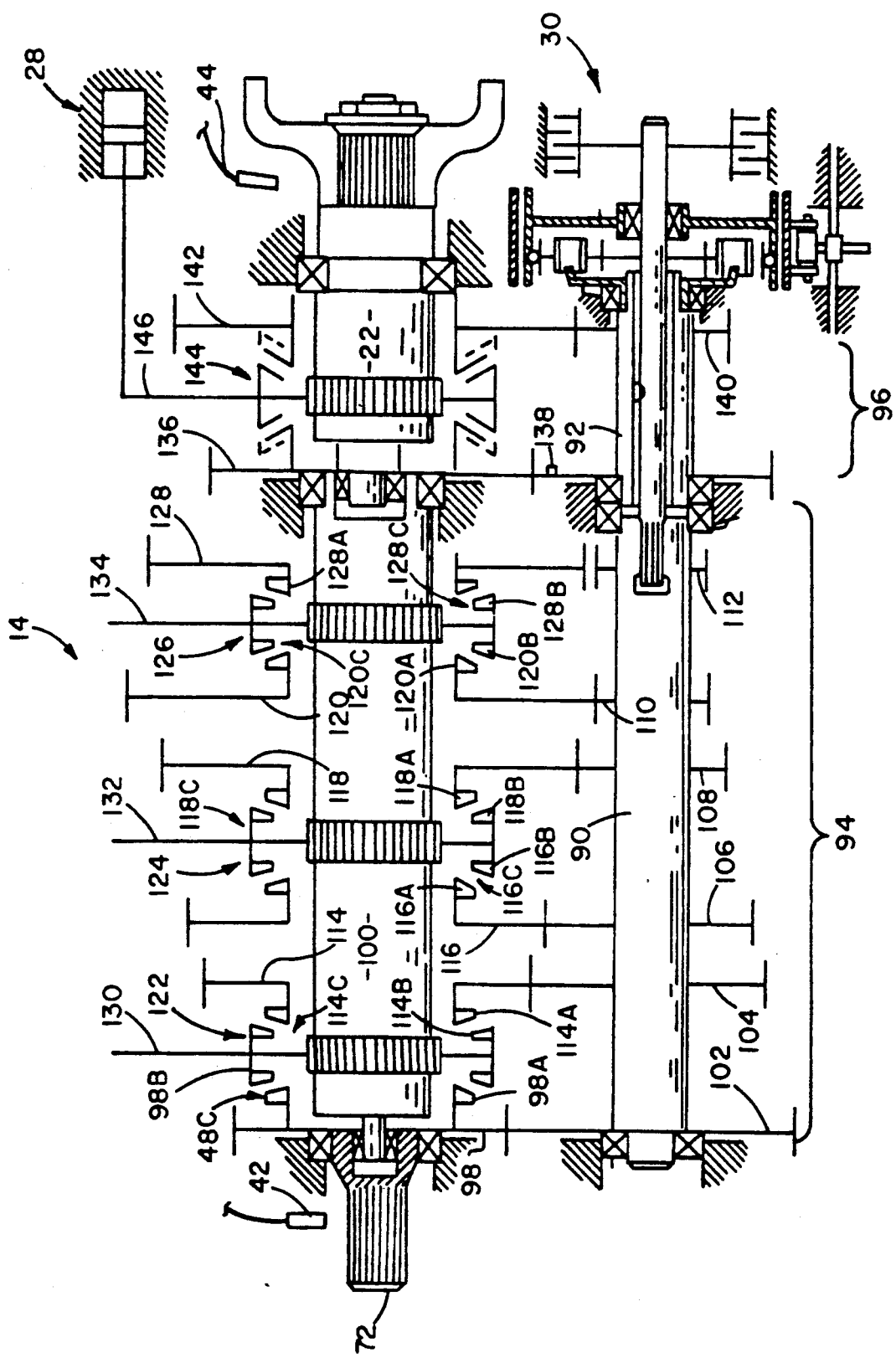
FIG. 3 is a partial view, in section, of the automatic mechanical transmission system of the present invention.

The torque converter lock-up and disconnect clutch assembly 10 and an automatic mechanical transmission system 12 utilizing same, of the present invention, are schematically illustrated in FIGS. 1, 2 and 3. The term "automatic mechanical transmission system" as used herein, shall mean a system comprising at least a throttle device controlled heat engine 16, a multi-speed jaw clutch type change gear transmission 14, a nonpositive coupling device such as a master friction clutch and/or a fluid coupling 10/20 interposed the engine and the transmission and a control unit 50 for automatically controlling same. Such systems will, of course, also include sensors and/or actuators for sending input signals to and/or receiving command output signals from the control unit.

While the present invention is particularly well suited for use in connection with transmission systems having a torque converter and torque converter lockup/disconnect clutch, the invention is also applicable to transmission systems having a standard friction master clutch drivingly interposed the engine and the transmission.

The automatic mechanical transmission system 12 of the present invention is intended for use on a land vehicle, such as a heavy duty truck, but is not limited to such use. The automatic mechanical transmission system 12 illustrated includes an automatic multi-speed mechanical change gear transmission 14 driven by a prime mover throttle device controlled engine 16 (such as a diesel engine) through a fluid coupling or torque converter assembly 20. The output of the automatic transmission 14 is an output shaft 22 which is adapted for driving connection to an appropriate vehicle component such as the differential of a drive axle, a transfer case, or the like as is well known in the prior art.

As will be discussed in greater detail below, the torque converter lock-up and disconnect clutch assembly 10 includes two separate, independently engageable clutches, preferably friction clutches, a torque converter disconnect clutch 24 and a torque converter lock-up or bypass clutch 26. The transmission 14 includes a transmission operating mechanism 28 which is preferably in the format of a pressurized fluid actuated shifting assembly of the type disclosed in above-mentioned U.S. Pat. No. 4,445,393. The transmission also preferably includes a power synchronizer assembly 30 which may be of the type illustrated and disclosed in above-mentioned U.S. Pat. Nos. 3,478,851, 4,023,443 or 4,614,126.

The present invention is also applicable to automated mechanical transmission systems not including a power synchronizer assembly.

The above-mentioned power train components are acted upon and monitored by several devices, each of which are known in the prior art and will be discussed in greater detail below. These devices may include a throttle position monitor assembly 32, which senses the position of the operator controlled vehicle throttle pedal or other fuel throttling device, a throttle control 34 which controls the supply of fuel to the engine, an engine speed sensor assembly 36 which senses the rotational speed of the engine, a torque converter disconnect clutch and lock-up clutch operator 40 which operates the torque converter disconnect and lock-up clutches, a transmission input shaft speed sensor 42, a transmission output shaft speed sensor 44, a transmission shifting mechanism operator 46 for controlling the operation of transmission shifting mechanism 28 and/or a power synchronizer mechanism actuator 48 for controlling the operation of power synchronizer mechanism 30.

The throttle control 34 may simply be an override device to reduce ("dip") fuel to the engine to a set or variable level regardless of the operator's positioning of the throttle pedal. Alternatively, the throttle control may be a portion of an electronic engine control complying with the above-mentioned SAE J1922 or a similar standard.

The above-mentioned devices supply information to and/or accept commands from an electronic central processing unit (ECU) 50. The central processing unit or controller 50 is preferably based on a digital microprocessor, the specific configuration and structure of which form no part of the present invention. The central processing unit 50 also receives information from a shift control or mode selector assembly 52 by which the operator may select a reverse (R), a neutral (N) or several forward drive (D, $D_L$) modes of operation of the vehicle. Typically, the D mode of operation is for on-highway vehicle travel while the $D_L$ mode of operation is for off-road operation.

Typically, the system also includes various sensors, circuits and/or logic routines for sensing and reacting to sensor and/or actuator failures.

As is known, the central processing unit 50 receives inputs from the various sensors and/or operating devices. In addition to these direct inputs, the central processing unit 50 may be provided with circuitry and/or logic for differentiating the input signals to provide calculated signals indicative of the rate of change of the various monitored devices, means to compare the input signals and/or memory means for storing certain input information, such as the direction of the last shift, and means for clearing the memory upon occurrence of predetermined events. Specific circuitry for providing the above-mentioned functions is known in the prior art and an example thereof may be seen by reference to above-mentioned U.S. Pat. Nos. 4,361,060 and 4,595,986 and/or by reference to a technical paper entitled "THE AUTOMATION OF MECHANICAL TRANSMISSIONS" published proceedings of a joint IEEE/SAE conference entitled International Congress 20 on Transportation Electronics, IEEE Catalog Number 84CH1988-5, the disclosure of which is hereby incorporated by reference.

As is well known in the operation/function of electronic control units, especially microprocessor based ECUs, the various logic functions can be performed by discrete hardwired logic units or by a single logic unit operating under different portions or subroutines of the control system logic rules (i.e. the software).

A more detailed schematic illustration of the torque converter 20 and torque converter lock-up and disconnect clutch assembly 10 drivingly interposed engine 16 and automatic change gear transmission 14 may be seen by reference to FIG. 1. The disconnect clutch 10 is also called an interrupt clutch. The torque converter assembly 20 is conventional in that it includes a fluid coupling of the torque converter type having an impeller 54 driven by the engine output or crank shaft 56 through a shroud 58, a turbine 60 hydraulically driven by the impeller and a stator or runner 62 which becomes grounded to a housing 64 via a one-way roller clutch 66 carried by a shaft 68 grounded to the housing 64. Shroud 58 also drives a pump 70 for pressurizing the torque converter, lubricating the transmission, selectively pressuring the transmission shifting mechanism 28 and/or power synchronizing mechanism 30 and/or operating the disconnect and bypass clutches 24 and 26. Pump 70 may be of any known structure such as, for example, a well known crescent gear pump.

The transmission 14 includes an input shaft 72 driven by the engine 16 via the torque converter assembly 20 and/or lock-up and disconnect clutch assembly 10. Transmission input shaft 72 carries a connecting member 74 fixed thereto for rotation therewith. Connecting member 74 includes a portion 76 associated with the torque converter disconnect clutch 24 and a second hub portion 78 splined for association with the input shaft. Briefly, as will be described in greater detail below, torque converter disconnect clutch 24 may be engaged or disengaged, independently of engagement or disengagement of lock-up clutch 26, to frictionally engage or disengage a connecting member 79 which is associated with the torque converter turbine 60 and a member of the lock-up clutch 26, to and from the transmission input shaft 72 via portion 76 of connecting member 74. Torque converter lock-up clutch 26 may be frictionally engaged or disengaged, independent of the engagement or disengagement of disconnect clutch 24, to frictionally engage the engine crankshaft 56, and shroud 58 driven thereby, to the connecting member 79.

Engagement of torque converter lock-up clutch 26 will engage the engine crankshaft 56, via shroud 58, directly with the connecting member 79, regardless of the engaged or disengaged condition of torque converter disconnect clutch 24, and thus provides an effective lock-up for locking-up the torque converter 20 and driving transmission 14 directly from the engine 16 if disconnect clutch 24 is engaged. Additionally, at speeds above torque converter lock-up speed, the lock-up clutch 26 need not be engaged and disengaged during shifting as disengagement of clutch 24 disconnects the inertia of connection member 79 from input shaft 72.

If the torque converter bypass clutch or lock-up 26 is disconnected, and the torque converter disconnect clutch 24 is engaged, the transmission 14 will be driven from engine 16 via the torque converter fluid coupling as is well known in the prior art. If the torque converter disconnect clutch 24 is disengaged, regardless of the condition of lock-up clutch 26, the transmission input shaft 72 is drivingly disengaged from any drive torque supplied by the engine or any inertial drag supplied by the torque converter, the engine and clutch 26. Disconnecting of the transmission input shaft 72 from the inertial affects of the engine, clutch 26 and/or torque converter allows the rotational speed of the input shaft 72, and all transmission gearing drivingly connected thereto, to be accelerated or decelerated by the transmission power synchronizer mechanism 30 in a more rapid manner for purposes of more rapidly achieving synchronization during a downshift or upshift of the transmission and also allows the power synchronizer 30 to cause the input shaft 72 to rotate at a rotational speed greater than any governed engine speed.

When the vehicle is at rest with the mode selector in the drive or off-highway drive mode, the disconnect clutch 24 will be engaged and the lock-up clutch 26 disengaged allowing for torque converter start-up with its well known advantages. At above a given vehicle speed and/or gear ratio, the advantages of torque converter operation are no longer required, and the increased efficiency of a direct drive between the drive engine and transmission is required. Upon these conditions, the torque converter lock-up clutch 26 will be maintained engaged allowing the transmission input shaft 72 to be driven directly from the engine via the torque converter shroud 58 and connecting member 79 when the disconnect clutch 24 is engaged.

As discussed above, clutch 24 will be disengaged to shift from a previously engaged gear to neutral, to allow the power synchronizer 30 to synchronize the jaw clutch members of the gear to be engaged and to allow engagement of the synchronized jaw clutches of the gear to be engaged.

Selection of the desired gear ratio and selection of the required engaged or disengaged condition of the torque converter disconnect or lock-up clutches, as well as the issuance of command signals to the various clutch and transmission operators is accomplished by the central processing unit 50 in a manner which is known in the prior art and which may be appreciated in greater detail by reference to above-mentioned U.S. Pat. Nos. 4,361,060 and 4,595,986.

The compound transmission 14 is illustrated in in greater detail in FIG. 3 and is of the type wherein the main section countershaft or countershafts 90 are coaxially aligned with the auxiliary section countershaft or countershafts 92. Transmission 14 is of a relatively standard design and is preferably of the twin countershaft type only one of which countershafts in the main and auxiliary sections, 94 and 96, respectively, is shown. Examples of such transmissions having coaxially aligned main section and auxiliary section countershafts may be seen by reference to U.S. Pat. Nos. 3,105,395 and 3,138,965, the disclosures of which are incorporated by reference.

Transmission 14 includes input shaft 72 to which member 78 is fixed for rotation therewith and which additionally carries input gear 98 nonrotatably attached thereto. Main section countershaft 90 is substantially parallel to mainshaft 100 and is provided with countershaft gears 102, 104, 106, 108, 110 and 112 fixed for rotation therewith. A plurality of mainshaft gears, also called ratio gears, 114, 116, 118 and 120, surround the mainshaft and are selectively clutchable thereto, one at a time, by double sided positive jaw clutch collars 122, 124 and 126. Jaw clutch collar 122 may also clutch the input shaft 72 directly to the mainshaft 100 while clutch collar 126 may clutch reverse mainshaft gear 128 to the mainshaft.

The mainshaft gears 114, 116, 118 and 120 circle the mainshaft and are in continuous meshing engagement with, and are preferably supported by, opposed pairs of countershaft gears 104, 106, 108 and 110 which mounting means and the special advantages resulting therefrom are explained in greater detail in above-mentioned U.S. Pat. Nos. 3,105,395 and 3,335,616. Reverse mainshaft gear 128 is in continuous meshing engagement with countershaft gear 112 by means of conventional intermediate idler gears (not shown). The forwardmost countershaft gear 102 is continuously meshed with and driven by input gear 98 for causing rotation of countershaft 90 whenever the input gear is rotatably driven.

Clutch collar 122 carries positive jaw clutch teeth 98$b$ and 114$b$ which are engageable with clutch teeth 98$a$ and 114$a$, respectively, to define positive jaw clutches 98$c$ and 114$c$, respectively. Clutch collar 124 carries positive jaw clutch teeth 116$b$ and 118$b$ which are engageable with jaw clutch teeth 116$a$ and 118$a$, respectively, to define positive jaw clutches 116$c$ and 118$c$, respectively. Jaw clutch collar 126 carries jaw clutch teeth 120$b$ and 128$b$ which are positively engageable with jaw clutch teeth 120a and 128a, respectively, to define positive jaw clutches 120c and 128c, respectively.

As is known in the prior art, each of the clutch collars are preferably directly or indirectly splined to the mainshaft for rotation therewith and axial movement relative thereto. Other mounting means for the clutch collars are known in the prior art and are intended to be included within the scope of the present invention. Each of the clutch collars 122, 124, and 126 is provided with means for receiving a shift fork or shift yoke 130, 132 and 134, respectively, whereby the clutch collars are axially moved, one at a time only, from the positions illustrated in FIG. 3 by the actuator 28.

A position sensor assembly 43 is provided for providing signals indicative of the axial positioning of the shift yokes or of the shift rails associated therewith. Typically, these signals are indicative of neutral-not neutral and/or of engaged-not engaged positions of the shift yokes and the jaw clutch members associated therewith.

The auxiliary transmission section 96 includes output shaft 22 which is preferably coaxial with input shaft 72 and mainshaft 100 and is supported for rotation in a transmission housing by means of bearings. The auxiliary section also includes an auxiliary section countershaft 92 supported for rotation in the housing by means of bearings. Fixed for rotation with mainshaft 100 is the auxiliary section drive gear 136. Auxiliary section countershaft 92 carries auxiliary section countershaft gears 138 and 140 fixed for rotation therewith. Auxiliary section countershaft gear 138 is constantly meshed with auxiliary section input gear 136 while auxiliary section countershaft gear 140 is constantly meshed with output gear 142 which surrounds the output shaft 22. A synchronized clutch structure 144, of conventional individually synchronized jaw clutch design, is utilized to selectively clutch mainshaft 100 and auxiliary drive gear 136 directly to the output shaft 22 for a direct drive connection between the mainshaft and output shaft or to clutch output gear 142 to the output shaft 22 for a reduction drive of output shaft 22 from mainshaft 100 through countershaft 92 as is well known in the prior art. Synchronized clutch structure 144 is controlled by shift fork 146 axially moved by actuator 28.

Transmission 14 is of the range type wherein the auxiliary section ratio step (or steps) is greater than the total ratio coverage of the main section ratios appearing in all ranges. Such transmissions are well known in the prior art, see U.S. Pat. No. 4,754,665, the disclosure of which is hereby incorporated by reference.

The power synchronizer assembly 30 includes a planetary speed increasing gear set driven by the output shaft 22 independently of the rotational speed of the drive engine 16, and selectively actuatable to accelerate the rotational speed of transmission elements driven by the input shaft 72 for purposes of synchronous rotation of jaw clutch members associated with the gear ratio to be engaged. Preferably, the power synchronizer assembly 30 will also include means to decelerate the transmission elements driven by the input shaft. Deceleration of the transmission elements driven by the input shaft may also be achieved by input shaft and/or engine braking devices which will preferably be controlled by central processing unit 50.

The power synchronizer assembly 30 is driven by the vehicle through gear 142 which is driven directly or indirectly by output shaft 22 and thus the power synchronizer is not effective to accelerate the main section countershaft 90 when the auxiliary section is not engaged. Details of construction and operation of the power synchronizer assembly 30 may be appreciated in greater detail by reference to above-mentioned U.S. Pat. No. 4,614,126.

Figure 4:
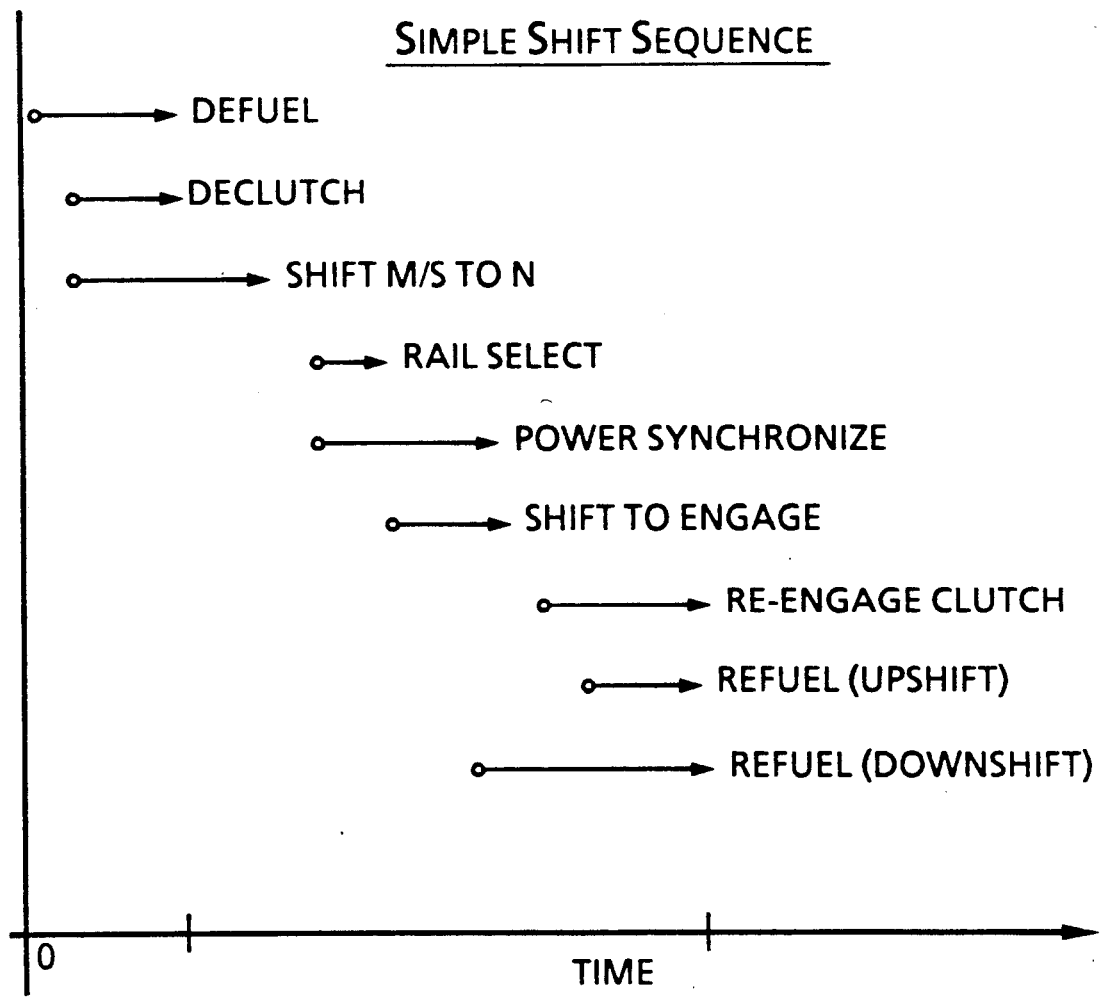
FIG. 4 is a graphical representation of a typical shift sequence for the transmission of FIG. 2.
Figure 5:
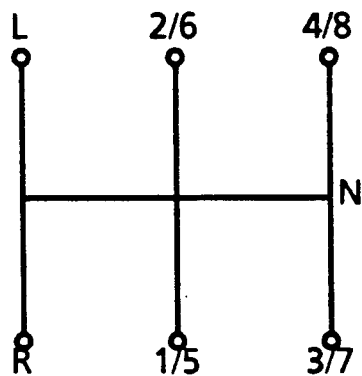
FIG. 5 is a symbolic representation of the shift pattern for the transmission of FIG. 3.

The shift sequence for a simple shift of transmission 14 in system 12 is illustrated in FIG. 4. Assuming the ECU 50 determines that a shift from second (2nd) to third (3rd) speed is required (i.e. a simple upshift), the ECU will cause fuel controller 34 to defuel (i.e. "dip") the engine regardless of the position of the throttle pedal 32. While the engine is being defueled, the disconnect clutch (or master clutch) 24 is disengaged and shift to main section 94 neutral is undertaken.

Upon defueling the engine, declutching the disconnect clutch and disengaging the main section, the power synchronizer is actuated to cause the mainshaft gearing (in this example 3rd speed mainshaft gear 114) to rotate at a target or substantially synchronous speed relative to mainshaft 100 as determined by output shaft speed and auxiliary section 96 ratio. Output shaft speed is sensed by sensor 44 while the speed of the various mainshaft gears is a known multiple of input shaft 72 speed as sensed by sensor 42.

The rail select function can occur at any time after main section disengagement and main section reengagement in the new ratio is timed to occur as the power synchronizer is bringing the engaged gear towards target speed. Of course, for an upshift the power synchronizer is normally required to retard the speed of the input shaft and associated gearing.

Upon achieving engagement of the proper main section ratio, the disconnect clutch is reengaged and the engine refueled.

Typically, a simple shift can be accomplished in about 0.70 to 0.80 seconds with a disconnect (i.e. torque break) time of about 0.50 seconds.

The main section 94 of transmission 14 of automated system 12, being derived from a manual nonsynchronized transmission, may butt jaw clutch teeth when attempting to engage a main section gear from neutral while the vehicle is stopped. This is a common occurrence with nonsynchronized transmissions, and requires the operator to partially engage the transmission master clutch to gently slip the butted clutch teeth off of the butting condition to achieve engagement.

The transmission control system/method, as implemented by ECU 50, must be able to detect this tooth butting condition on initial engagement and take action to slip the gear into an engaged position.

While tooth butting is not exclusively a problem associated with nonsynchronized transmissions, the use of relatively blunt or bullet nosed clutch teeth in nonsynchronized transmissions, compared with the relatively pointed nose teeth typically used on synchronized transmissions, makes tooth butting much more of a problem in nonsynchronized transmissions.

In shifting automated transmission 14, as with almost all nonsynchronized manual transmissions, the selection of drive or reverse from neutral (initial engagement) can result in a tooth butting condition when the vehicle is stopped.

Figure 6:
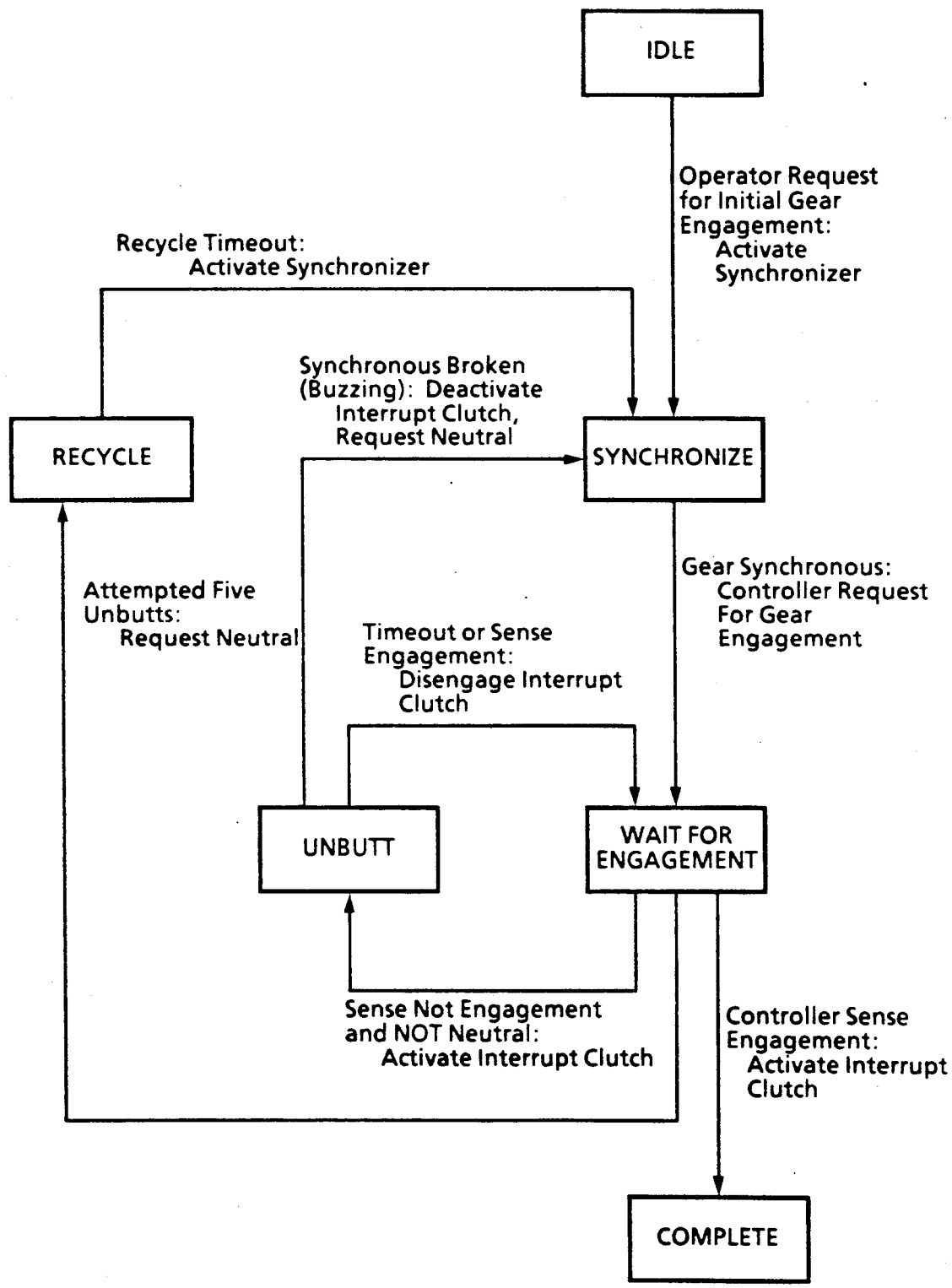
FIG. 6 is a transition diagram of the control system/method logic of the present invention.

Referring to the transition diagram of FIG. 6, as part of the initial engagement shift sequence (request for main section gear engagement from neutral while stopped), the control system/method first synchronizes the input shaft to the target gear speed, then requests gear engagement. If the control system senses that the shift actuator successfully moved from neutral but failed to achieve full engagement (after 0.5 seconds), the system briefly requests disconnect clutch (24) engagement (for 0.5 seconds). If the control system continues to fail to detect engagement (after 1 second) then the interrupt clutch is briefly engaged for a longer period of time (1 second). The control system repeats this cycle five times, using longer and longer disconnect clutch engagement periods, while continuously monitoring for engagement. If axial jaw clutch engagement is ever detected during this sequence, then the disconnect clutch is engaged and the shift sequence is complete. If after the five cycles axial jaw clutch engagement is not detected, then neutral is requested and the cycle repeats from the beginning of the initial engagement shift sequence.

The input shaft and output shaft speed sensors, 42 and 44, respectively, are used to sense the rotational speed of engaging jaw clutch members, and rail position sensors, 43, are used for sensing neutral/not neutral and engaged/not engaged axial movement of the movable jaw clutch members 98b, 114b, 116b, 118, 120b or 128b. Upon an attempted engagement under start from stop conditions, if, for a predetermined period of time, the engaging jaw clutch is at a not neutral and not engaged condition, while the jaw clutches are rotating at a substantially synchronous speed, this indicates jaw clutch butting and the ECU 50 will issue command output signals to the clutch operator 38/40 to cause a momentary engagement of the disconnect or master friction clutch to attempt to rotate or knock the teeth off abutment and into engagement. If this is not successful, i.e. the rail position sensor continues to indicate a not engaged condition while the speed sensors indicate continued synchronous rotation of the clutch members, the attempt to unbutt is recycled a given number of times, preferably for increasingly long periods of disconnect or master clutch engagement. If a given number of attempts to cause tooth unbutting is unsuccessful, then the entire gear engagement process is restarted.

As indicated above, upon sensing a tooth butt condition, it is necessary to slightly engage the friction coupling 10 interposed the engine 16 and the transmission input shaft 72.

The control of an interrupt or disconnect clutch 10, or of a master friction clutch, in an automated mechanical transmission system often has a relatively small degree of modulation and thus the transmission control system cannot manipulate the rate of clutch engagement as can an operator of a manual transmission. During an initial engagement from neutral where a tooth butting situation exists, the controller must engage the interrupt clutch (24) to slip the gear teeth off of the butting condition to achieve engagement. Since the interrupt clutch engagement is often very aggressive as compared to what is required to slip the gears off the butting condition, the gear teeth may not axially engage as desired when the interrupt clutch is activated but rather may buzz or grind. This is very abrasive to the vehicle operator and abusive to the transmission. The control system needs to detect the buzzing condition at the instant of occurrence and take immediate action to reduce the adverse effects of gear grinding.

Referring again to the transition diagram of FIG. 6, the selection of drive or reverse from neutral (initial engagement) can result in a tooth butting condition when the vehicle is stopped. On occurrence of a tooth butting, the control system must briefly engage the interrupt clutch as to knock the gears off of the butting condition. While the interrupt clutch is engaged the controller monitors the shaft speeds of the two gears being engaged. The shaft speeds should be synchronized whenever the gears are engaged or butting. If a gear buzz condition occurs, jaw clutch synchronization is lost. The moment a significant continuing nonsynchronization of the jaw clutch members is detected, the logic disengages the interrupt clutch and requests neutral to minimize the buzzing. Once neutral is achieved then the controller begins the initial engagement shift sequence from the beginning.

Accordingly, an automated mechanical transmission system 12, based upon a normally manually shifted nonsynchronized transmission 14, is provided which has a control system/method including logic for detecting jaw clutch butting and/or buzzing conditions and for taking action to overcome same.

It is understood that the above description of the preferred embodiment is by way of example only and that various modifications, substitutions and/or rearrangements of the parts are possible without departing from the spirit and the scope of the present invention as hereinafter claimed.

We claim:

1. A method for controlling shifting of an automated mechanical transmission system (12) of the type comprising a mechanical transmission (14) including a shift actuator (28), a fuel controlled engine (16), a nonpositive coupling (10) drivingly interposed the engine and the transmission, and a central control unit (50) effective to receive input signals indicative of the status of the transmission system including (i) signals indicative of the rotational speeds of transmission shafts (42, 44) and (ii) signals indicative of the positioning of transmission jaw clutch members (43) and to process same in accordance with logic rules to issue command output signals to a plurality of system actuators, including the shift actuator (28) and a nonpositive coupling actuator (38/40), said method including the steps, responsive to sensing a required shift from transmission neutral into a selected gear ratio, of causing the nonpositive coupling (10) to be disengaged, then causing the jaw clutch members (98a/b, 114a/b, 118a/b, 120a/b, 128a/b) associated with the selected gear ratio to rotate at a substantially synchronous speed and then causing said jaw clutch members to be continuously urged into positive engagement;

said method characterized by:
continuing to sense the rotational speeds and relative axial positions of said jaw clutch members; and
if, after a first period of time, said jaw clutch members continue to rotate at a substantially synchronous speed and do not move into an axial position indicative of positive jaw clutch engagement, determining that a tooth butt condition exists.

2. The method of claim 1 wherein said method is further characterized by:
after determining that a tooth butt condition exists, causing said nonpositive coupling (10) to be momentarily engaged for a second relatively short period of time and then again disengaged.

3. The method of claim 2 wherein said method is further characterized by:
if, after said nonpositive coupling has been engaged for said second period of time and then disengaged, said conditions causing a tooth butt condition to be determined continue to exist, causing said nonpositive coupling to be repeatedly engaged for a relatively short third period of time and then again disengaged until said conditions cease to exist or the number of said cycles of nonpositive clutch engagement and then disengagement exceed a given number.

4. The method of claim 3 wherein said third period of time exceeds said second period of time.

5. The method of claim 4 wherein said third period of time is variable and increases with each of said cycles.

6. The method of claims 3, 4 or 5 wherein said method is further characterized by:
if said number of cycles exceeds said given number and said conditions continue to exist, then causing said jaw clutch members to be moved away from said relative axial position of positive engagement.

7. The method of claims 2, 3, 4, or 5 further characterized by:
if, at any time that said nonpositive coupling (10) is engaged and said jaw clutch members are urged into positive engagement, said jaw clutch members rotate at substantially nonsynchronous speeds, immediately causing said jaw clutch members to be moved to a relative axial positioning of disengagement.

8. The method of claim 6 further characterized by:
if, at any time that said nonpositive coupling (10) is engaged and said jaw clutch members are urged into positive engagement, said jaw clutch members rotate at substantially nonsynchronous speeds, immediately causing said jaw clutch members to be moved to a relative axial positioning of disengagement.

9. The method of claims 1, 2, 3, 4 or 5 wherein said nonpositive coupling comprises a torque converter (20) and a friction torque converter interrupt clutch (24).

10. The method of claim 6 wherein said nonpositive coupling comprises a torque converter (20) and a friction torque converter interrupt clutch (24).

11. The method of claim 7 wherein said nonpositive coupling comprises a torque converter (20) and a friction torque converter interrupt clutch (24).

12. The method of claims 1, 2, 3, 4 or 5 wherein said transmission system includes a power synchronizer assembly (30).

13. The method of claim 6 wherein said transmission system includes a power synchronizer assembly (30).

14. The method of claim 7 wherein said transmission system includes a power synchronizer assembly (30).

15. The method of claim 9 wherein said transmission system includes a power synchronizer assembly (30).

16. The method of claims 1, 2, 3, 4 or 5 wherein said transmission is a nonsynchronized transmission.

17. The method of claim 6 wherein said transmission is a nonsynchronized transmission.

18. The method of claim 7 wherein said transmission is a nonsynchronized transmission.

19. The method of claim 9 wherein said transmission is a nonsynchronized transmission.

20. The method of claim 12 wherein said transmission is a nonsynchronized transmission.

21. The method of claims 1, 2, 3, 4 or 5 wherein said control unit (50) comprises an electronic microprocessor based control unit.

22. The method of claims 1, 2, 3, 4 or 5 wherein said nonpositive coupling comprises a selectively engageable and disengageable friction clutch.

23. The method of claim 6 wherein said nonpositive coupling is a selectively engageable and disengageable friction clutch.

24. A control system for controlling shifting of an automated mechanical transmission system (12) of the type comprising a mechanical transmission (14) including a shift actuator (28), a fuel controlled engine (16), a nonpositive coupling (10) drivingly interposed the engine and the transmission, and a central control unit (50) effective to receive input signals indicative of the status of the transmission system including (i) signals indicative of the rotational speeds of transmission shafts (42, 44) and (ii) signals indicative of the positioning of transmission jaw clutch members (43) and to process same in accordance with logic rules to issue command output signals to a plurality of system actuators, including the shift actuator (28) and a nonpositive coupling actuator (38/40), said logic rules including rules, responsive to sensing a required shift from transmission neutral into a selected gear ratio, of causing the nonpositive coupling (10) to be disengaged, then causing the jaw clutch members (98a/b, 114a/b, 118a/b, 120a/b, 128a/b) associated with the selected gear ratio to rotate at a substantially synchronous speed and then for causing said jaw clutch members to be continuously urged into positive engagement;
said system characterized by said logic rules including rules:
for continuing to sense the rotational speeds and relative axial positions of said jaw clutch members; and
if, after a first period of time, said jaw clutch members continue to rotate at a substantially synchronous speed and do not move into an axial position indicative of positive jaw clutch engagement, for determining that a tooth butt condition exists.

25. The control system of claim 24 wherein said system is further characterized by rules:
for, after determining that a tooth butt condition exists, causing said nonpositive coupling (10) to be momentarily engaged for a second relatively short period of time and then again disengaged.

26. The control system of claim 25 wherein said system is further characterized by rules:
for, if, after said nonpositive coupling has been engaged for said second period of time and then, disengaged said conditions causing a tooth butt condition to be determined continue to exist, causing said nonpositive coupling to be repeatedly engaged for a relatively short third period of time and then again disengaged until said conditions cease to exist or the number of said cycles of nonpositive clutch engagement and then disengagement exceed a given number.

27. The control system of claim 26 wherein said third period of time exceeds said second period of time.

28. The control system of claim 27 wherein said third period of time is variable and increases with each of said cycles.

29. The control system of claims 26, 27 or 28 wherein said method is further characterized by rules:
for, if said number of cycles exceeds said given number and said conditions continue to exist, then causing said jaw clutch members to be moved away from said relative axial position of positive engagement.

30. The control system of claims 25, 26, 27 or 28 further characterized by rules:

for, if, at any time that said nonpositive coupling (10) is engaged and said jaw clutch members are urged into positive engagement, said jaw clutch members rotate at substantially nonsynchronous speeds, immediately causing said jaw clutch members to be moved to a relative axial positioning of disengagement.

31. The control system of claim 29 further characterized by rules:

for, if, at any time that said nonpositive coupling (10) is engaged and said jaw clutch members are urged into positive engagement, said jaw clutch members rotate at substantially nonsynchronous speeds, immediately causing said jaw clutch members to be moved to a relative axial positioning of disengagement.

32. The control system of claims 24, 25, 26, 27 or 28 wherein said nonpositive coupling comprises a torque converter (20) and a friction torque converter interrupt clutch (24).

33. The method of claims 24, 25, 26, 27 or 28 wherein said transmission system includes a power synchronizer assembly (30).

34. The control system of claim 29 wherein said transmission system includes a power synchronizer assembly (30).

35. The control system of claim 30 wherein said transmission system includes a power synchronizer assembly (30).

36. The control system of claim 31 wherein said transmission system includes a power synchronizer assembly (30).

37. The control system of claims 24, 25, 26, 27 or 28 wherein said transmission is a nonsynchronized transmission.

38. The control system of claims 24, 25, 26, 27 or 28 wherein said nonpositive coupling comprises a selectively engageable and disengageable friction clutch.

39. The method of claim 29 wherein said nonpositive coupling comprises a selectively engageable and disengageable friction clutch.

* * * * *